United States Patent [19]

Kolfertz

[11] 3,719,278
[45] March 6, 1973

[54] EXTERNAL FILTERS FOR AQUARIA

[76] Inventor: Erwin Kolfertz, Bebelallee 9, Solingen-Merscheid, Germany

[22] Filed: Oct. 8, 1970

[21] Appl. No.: 79,114

[30] Foreign Application Priority Data

Dec. 17, 1969 Germany ................... G 69 48 723.6

[52] U.S. Cl. ............................................... 210/169
[51] Int. Cl. ................................................ E04h 3/20
[58] Field of Search ..................................... 210/169

[56] References Cited

UNITED STATES PATENTS

| 3,513,978 | 5/1970 | Newsteder | 210/169 |
| 3,525,435 | 8/1970 | Conner, Jr. | 210/169 |
| 3,145,168 | 8/1964 | Scafuro | 210/169 |
| 597,249 | 1/1898 | Smith | 210/169 X |
| 2,652,151 | 9/1953 | Legus | 210/169 UX |
| 3,371,789 | 3/1968 | Hense | 210/169 |

Primary Examiner—Reuben Friedman
Assistant Examiner—T. A. Granger
Attorney—Arthur O. Klein

[57] ABSTRACT

An external filter for cleaning the water of an aquarium, wherein water is extracted from the aquarium and supplied to an inlet chamber from which it flows through a filter chamber to an outlet chamber which is fitted with a tube extending downwards from the bottom of the chamber, the tube being closed at its lower end, and a second tube which is mounted in the first tube and which opens at its lower end adjacent the lower end of the first tube and opens at its upper end into an overflow channel which is positioned above the outlet chamber, there being an air supply means which is arranged to inject air into the lower end of the second tube in order to initiate a gas lift for raising the filtered water from the outlet chamber via the tubes to the overflow channel which then directs it back into the aquarium. As an alternative, the inlet, which preferably functions with a siphonic action, may open directly into the filter chamber from which it flows into two outlet chambers each of which is provided with a similar gas lift device for returning the filtered water to the aquarium.

6 Claims, 3 Drawing Figures

PATENTED MAR 6 1973

EXTERNAL FILTERS FOR AQUARIA

The invention relates to external filters for cleaning the water of aquaria.

Both internal and external filters are known for filtering aquarium water, a motor driven water pump being provided for circulating the water through the filter. Filters of this kind, equipped with a motor driven water pump, are dangerous due to the risk of water coming into contact with the electrical system of the pump motor and thus producing a short circuit. A further disadvantage of these filters is that power consumption is high, compared with the small amount of energy which is necessary for circulating the water.

It has been proposed to utilize a current of aerating air for circulating the water, both in internal and in external filters. This method has the advantage that the danger of electrical short circuit is much reduced and the power consumption is also reduced. However the air driven filters known at the present do not provide a sufficiently good circulation of the water.

With the aim of providing an air driven external filter for cleaning the water of an aquarium which has better water circulation than is known at present, according to the invention an external filter comprises an inlet for supplying water to be filtered from an aquarium to the filter, a filter chamber, and a pair of other chambers which communicate with the filter chamber to allow passage of water between the filter chamber and each of the other chambers, at least one of the other chambers forming an outlet chamber for filtered water which is provided with a tube which extends downwards from the bottom of the chamber and which is closed at its lower end, and a second tube which is mounted in the first tube and which opens at its lower end adjacent the lower end of the first tube and opens at its upper end into an overflow channel which is positioned above the chamber and is arranged to direct filtered water back to the aquarium, and an air supply means which is arranged to inject air into the lower end of the second tube in order to initiate a gas lift for raising the filtered water to the overflow channel.

Preferably one of the pair of other chambers forms an inlet chamber into which opens the inlet for supplying water from the aquarium, this water, in use, flowing from the inlet chamber into the filter chamber where it is filtered before flowing on into the outlet chamber for return to the aquarium. Such a filter is simple in construction and is easily maintained, and furthermore may easily be equipped if desired with a controlled heating system. The water is circulated from the aquarium through the filter and back to the aquarium just as energetically as if an electrically driven water pump is used, and the air lift has the added advantage that the water is aerated at the same time.

The double tube air lift operates with the filtered water flowing downwards from the outlet chamber through the space between the two tubes, and then upwards in the interior of the inner tube, conveyed upwards by the lift effect of the air bubbles injected into the inner tube. The result is a remarkably efficient circulation of the water.

Preferably the two tubes of the double tube air lift are telescopically extensible, enabling the rate of circulation of the water to be adjusted independently of the rate of injection of air. Extending the double tube air lift to give a lifting tube of greater height increases the conveying effect, that is to say the water is circulated more rapidly. The same filter can therefore be used for aquaria of different dimensions, the rate of water circulation being adjusted in each case, to suit the particular requirements, merely by telescopically adjusting the length of the double tube air lift, no modification of the rest of the filter being necessary.

The air supply means comprises an air pump and a delivery tube which carries the air to the lower end of the inner air lift tube, the air preferably being injected through a fritted glass bubbler head which is mounted on the end of the delivery tube within the inner air lift tube so as to produce a multitude of small bubbles. These are evenly distributed in the column of water in the inner tube and lowers its apparent density. This has the effect that the level of water in the tube rises higher than that in the surrounding tube, i.e. in the outlet chamber so that the water in the inner tube is, in effect lifted by the air bubbles. Water lost from the column at the upper end into the overflow channel is replaced by water entering at the lower end from the outer tube.

The lower end of the inner air lift tube rests on the closed lower end of the outer air lift tube. To allow the water descending in the space between the two tubes to enter the lower end of the inner air lift tube, the lower end of the inner air lift tube may have a slot, or the peripheral lower edge may have a saw-tooth formation, the points of the saw-teeth resting on the closed end of the outer air lift tube.

The overflow channel may comprise an open-topped tank, the inner air lift tube opening through its bottom, which is a rectangular parallelopiped in shape and which has a lateral opening communicating with a delivery gutter of rectangular cross section. Using a tank and a delivery gutter of rectangular cross section has the advantage that the turbulence present in the filtered water when it leaves the inner air lift tube is easily suppressed, so that the filtered water is returned to the aquarium at an even flow which is comparatively free from vortices.

For the same reason the inlet which is preferably an inverted U-shaped siphon, is preferably rectangular in cross-section. In use one arm of the siphon has its end immersed in the water in the aquarium and the other arm projects into the water in the filter, preferably into the inlet chamber. At its highest point, i.e. at the U-bend, the siphon may be equipped with a suction connection, through which air can be evacuated to put the siphon into operation, that is to say so as to form a continuous column of water in the siphon.

The filter in accordance with the invention is designed for easy accessibility and easy maintenance and in this respect the chambers are preferably formed within a housing, the filter chamber being enclosed by three transverse separator plates which extend between the side walls of the housing, one of the plates extending downwards from the top of the housing and terminating with its lower edge spaced above the bottom of the housing this lower edge of the plate having an angled flange which supports a second of the plates which forms the bottom of the filter chamber, these two plates separating the filter chamber from the outlet chamber. The first and third separator plates are vertical and may be positioned by guide rails which are formed integrally with the side walls of the housing. With this arrangement the filter chamber, which may for example contain cotton wool as a filtering medium, is easily accessible and can easily be dismantled for cleaning. The filter plate, i.e. the second separator plate, is simply lifted out and the two vertical plates are lifted out from their guides.

Preferably, the third separator plate separates the inlet chamber from the filter chamber and extends upwards from the bottom of the housing terminating short of the top of the housing so that, in use, the upper edge of the plate forms a weir for water passing from the inlet chamber to the filter chamber. The filter plate, which supports the filtering medium, has perforations to allow passage of the filtered water, and the first separator plate, which separates the filter chamber from the outlet chamber, may have perforations only in its lower part, that is to say only up to the level of the upper edge of the third separator plate. This is to ensure that water cannot flow directly from the inlet chamber to the outlet chamber without first passing through the filtering medium. The water follows a serpentine path, flowing quietly and passing through a large area of filtering medium.

In order to prevent excessive loss of heat from the aquarium water to the ambient atmosphere, and to moderate the noise made by the water flowing through the filter chambers, the housing may be equipped with a cover of U-shaped cross section, having lateral openings to accommodate the siphon and the overflow channel. The cover also serves to trap any spray issuing from the filter housing. In order to facilitate cleaning or replacement of parts, the interior of the cover is equipped with integral cross bars or rails positioned to engage and locate the overflow tank and hence the inner air lift tube in position.

When the external filter is in use, it is preferably, attached to a wall of the aquarium. For this purpose a side wall of the housing may be extended horizontally to form an L-shaped flange, whose edge is bent down so that the flange approximately fits over the upper edge of the aquarium. A locking screw passes through the bent down edge of the flange to secure the filter to the wall of the aquarium.

The fresh water or seawater in an aquarium usually must be maintained at an appropriate temperature. For this purpose the aquarium usually contains a heating device, controlled by a thermostat. However, these devices are often regarded as unsightly accessories in the aquarium tank and therefore, in the present case both the thermostat and the heating device are preferably accommodated in the external filter, the thermostat being installed in the inlet chamber and the heating device in the outlet chamber. The heating device may even be installed in the inner air lift tube. This arrangement has the particular advantage that even small temperature fluctuations in the aquarium water are compensated with the least possible delay, the thermostat sensing the temperature change at the inlet of the filter and sending a signal to the heating device, which heats the water on its way back to the aquarium. The rapid response obtained prevents temperature surges. To allow the thermostat and the heating device to be installed and removed rapidly, they may be secured to the housing wall by clips or guides which are integral with the wall.

When an aquarium contains seawater there is often a tendency for foam to form. In this case, there may be mounted on the top of the overflow tank a protein foam trap which prevents or disperses the foam.

The filter in accordance with the invention may with advantage be arranged in such a way that the inlet siphon opens into the filter chamber, both of the other two chambers forming outlet chambers each equipped with a double tube air lift with a superposed overflow channel. This arrangement allows two aquaria to be supplied simultaneously with filtered water by a single filter. Alternatively if desired filtered water can be supplied to a single aquarium at two different locations. This can be an advantage, particularly in large aquaria, in serving to provide homogeneous water conditions.

The external filter in accordance with the invention is outstanding not only due to its particularly simple construction, and consequent reliability in operation, but also because it allows water to be circulated at approximately twice the rate in comparison with common filter systems which use motor driven water pumps, with only 4 percent of the power consumption.

An example of an external filter in accordance with the present invention is illustrated in the accompanying drawings, in which.

Figure 1:
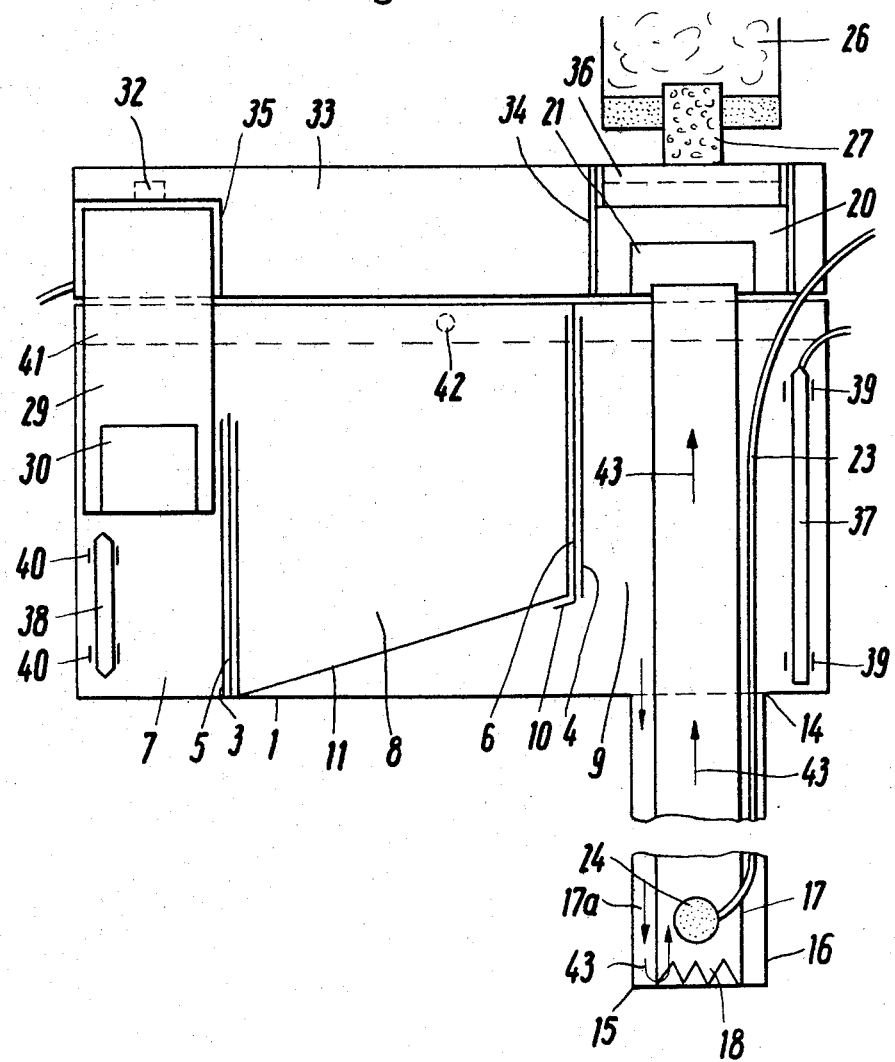
FIG. 1 is a diagrammatical longitudinal section through the filter.

The filter shown in the drawings has a rectangular box housing 1 which is open at the top. The side walls 2 are equipped with two pairs of guide rails 3 and 4 acting as retainers for two separator plates 5 and 6 which divide the housing 1 into three chambers, an inlet chamber 7, a filter chamber 8 and an outlet chamber 9. The guide rails 3, 4 are formed integrally with the walls of the housing, which is preferably injection moulded from a plastics material. The separator plate 5, which separates the inlet chamber 7 from the filter chamber 8, extends from the bottom of the housing upwards and terminates short of the top of the housing. In use water which enters the inlet chamber 7 must flow over the plate 5 into the filter chamber 8 and the plate 5 therefore acts as a baffle or a weir plate. On the other hand the separator plate 6, which separates the filter chamber 8 from the outlet chamber 9, extends downwards from the top of the housing 1 and terminates short of the bottom of the housing, and thus water has to flow under the separator plate 6 from the filter chamber 8 to the outlet chamber 9. The lower edge of the separator plate 6 is angled inwards towards the filter chamber 8, as shown at 10. The angled edge 10 supports an inclined filter plate 11 which forms the base of the filter chamber 8. Below the plate 11 is a wedge shaped chamber which forms part of the outlet chamber 9. The filter plate 11 and the separator plate 6 have openings 12, 13 through which the filtered water can pass from the filter chamber 8 into the outlet chamber 9. The openings 13 in the separator plate 6 are limited to the lower part of the plate, to prevent water from the inlet chamber 7 from flowing directly across unfiltered into the outlet chamber 9.

Figure 3:
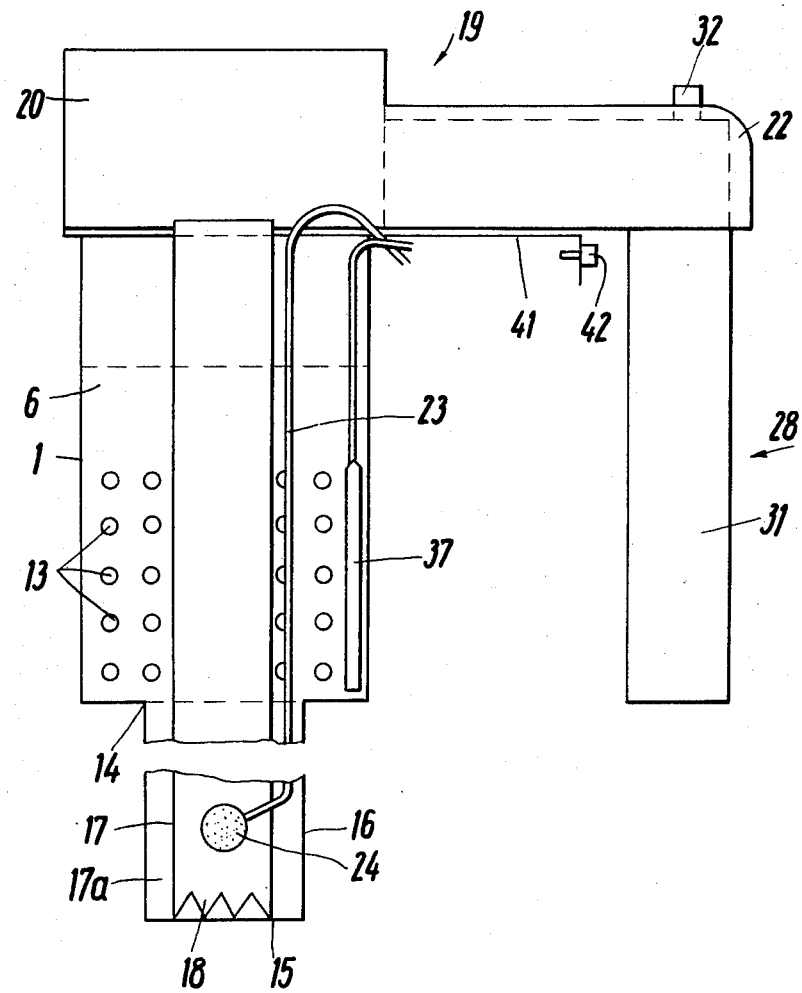
FIG. 3 is a cross section taken along the line III—III in FIG. 2.

In the bottom of the outlet chamber 9 there is an opening 14, to which is connected a tube 16 which is closed at its lower end 15. Inside the tube 16 there is a concentric inner tube 17, and the concentric pair of tubes extend downwards a considerable distance below the housing 1. The lower end of the inner tube 17 is partly cut away to form a saw-tooth end 18 which rests on the closed end 15 of the tube 16, so that water can flow down through the annular space 17a between the tubes, inwards between the saw-teeth 18 and upwards inside the inner tube 17. Instead of the saw-tooth end 18, the lower end of the inner tube 17 may be provided with a slot for the water to pass through. The upper end of the inner tube 17 extends to above the water level in the outlet chamber 9 and has fixed to it an overflow channel 19 (FIG. 3). This consists of a tank 20 open at the top and having an outlet opening 21 in its side, through which water overflows to a channel 22 leading, in use, back to the aquarium. The tank 20 is a rectangular parallelopiped in shape and the channel 22 is rectangular in cross-section.

The inner tube 17 contains, near its saw-tooth lower end 18, a fritted glass bubbler 24, through which air is injected in the form of small bubbles into the column of water in the tube 17. The bubbler 24 is connected by a tube 23 to a source of air, for example a diaphragm pump, which is not shown in the drawing.

Above the overflow tank 20 there may be mounted a protein foam trap (see FIG. 1) consisting of a catchment tank 26 mounted on a riser pipe 27 which projects upwards to above the floor of the catchment tank 26. The protein foam trap is necessary when the filter is used with a seawater aquarium since usually a certain amount of foam is produced. The foam rises upwards through the riser pipe 27 and can be removed by appropriate means from the catchment tank 26. The foam trap is not necessary with fresh water aquaria and is not shown in FIGS. 2 and 3 for simplicity.

In use, water from the aquarium enters the inlet chamber 7 through a siphon duct 28 in the form of an inverted U and having a rectangular cross-section. One arm 31 of the U is immersed in the water in the aquarium and the other arm 29 of the U is installed in the inlet chamber 7, reaching down to below the upper edge of the separator plate 5. The end of the siphon arm 29 in the inlet chamber 7 has a rectangular opening 30, to prevent excessive formation of turbulence in the water flowing into the inlet chamber 7. The middle part of the siphon duct 28 has in its upper surface a suction connection 32 for evacuation of air when the siphonic action is to be set in operation.

Figure 2:
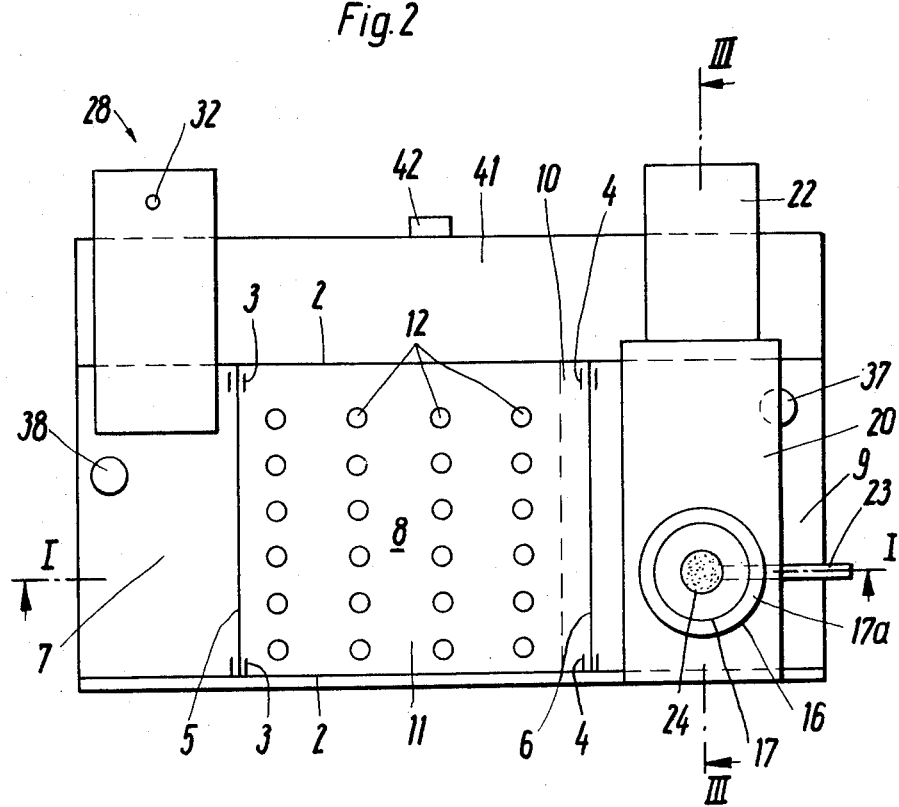
FIG. 2 is a plan view of the filter.

As shown in FIG. 1, the housing 1 is covered over by a cover 33 which has vertical side walls. One side wall has cut-outs 34, 35 to make room for the overflow channel 19 and the inverted siphon duct 28. The interior of the cover 33 is equipped with integral support rails 36 for correctly positioning the overflow tank 20 and the inner tube 17. The cut-outs 34, 35 serve to correctly position the inverted siphon duct 28, and the overflow channel 19 with respect to the housing, both these parts being separate from the housing. That is to say they are merely placed in position on the housing 1.

The housing 1 also contains a thermostat 38 and a heating device 37. The thermostat 38 is accommodated in the inlet chamber 7, whereas the heater 37 is in the outlet chamber 9. Each of these devices is attached to the wall of the housing by clips or holders 39, 40. The thermostat 38 senses the temperature of the water entering the filter from the aquarium and on falling to a set value the thermostat 38 sends out a signal which activates the heater 37 to heat the water leaving the filter. There is therefore little or no time delay, that is to say as soon as the water leaving the aquarium is heated.

The upper edge of the housing has an L-shaped flange 41 for attachment of the filter to the upper edge of an aquarium wall, by means of a clamping screw 42.

This example of an external aquarium filter in accordance with the invention functions as follows. After attaching the filter to the aquarium, and filling the housing with water to the desired level, the siphon duct 28 is brought into operation by evacuating air through the suction connection 32, so as to form an uninterrupted column of water in the siphon. The air pump, which is not shown, is then started up and small air bubbles emerge from the air bubbler 24 and rise upwards in the column of water in the tube 17. The water in the tube 17 rises, by the gas lift effect, and overflows through the overflow channel 19 into the transfer channel 22 and thence into the aquarium. The loss of water from the tube 17 is made up by a stream of water flowing from the outlet chamber 9 down through the annular space 17a and into the inner tube 17, as indicated by the arrows 43 in FIG. 1. Aquarium water entering the housing 1 through the inverted siphon duct 28 passes from the inlet chamber 7 to the chamber 8 where it passes through a pad of filtering material, for example cotton wool, which removes solid particles before passing to the outlet chamber 9.

During operation of the filter the water level is highest in the inlet chamber 7, somewhat lower in the filter chamber 8 and lowest in the outlet chamber 9.

I claim:

1. An external filter for cleaning the water of an aquarium, including inlet means for supplying water to be filtered from said aquarium to said filter, a housing, means within said housing defining a filter chamber and a pair of other chambers which communicate with said filter chamber to allow passage of water between said filter chamber and each of the other of said chambers, at least one of said other chambers being adapted to form an outlet chamber for filtered water and being provided with means for returning said filtered water to said aquarium comprising a tube extending downwards from the bottom of said outlet chamber, a closure at the lower end of said tube, a second tube positioned within said first tube and extending upwards through said outlet chamber to above said outlet chamber, means defining an opening at the lower end of said second tube and adjacent the lower end of said first tube whereby said first and second tubes communicate with each other, an overflow channel adjacent the upper end of said second tube, and air supply means connected to the lower end of said second tube whereby air is injected into said second tube to initiate a gas lift for raising filtered water up said second tube, means defining an opening at the upper end of said second tube whereby said raised filtered water flows into said overflow channel for direction back to said aquarium, one of said other two chambers being adapted to form an inlet chamber and said inlet means is connected to said inlet chamber, said filter including means for ensuring that water supplied by said inlet means from said aquarium flows from said inlet chamber into said filter chamber where it is filtered before flowing on to said outlet chamber for return to said aquarium, the said means defining said filter chamber comprising opposed side walls of said housing, and three transverse separator plates extending between said opposed side walls, one of said three separator plates extending downwards from the top of said housing, a lower edge on said one separator plate spaced above the bottom of said housing, an angled flange mounted at said lower edge of said one plate, and a second of said three transverse separator plates being supported on said angled flange and forming the bottom of said filter chamber, said first and second separator plates separating said filter chamber from said outer chamber.

2. An external filter as claimed in claim 1, wherein said second separator plate which forms the bottom of said filter chamber is perforated.

3. An external filter as claimed in claim 1, wherein the third of said three transverse separator plates separates said inlet chamber from said filter chamber and extends upwards from the bottom of said housing, a top edge of said third separator plate being spaced from the top of said housing whereby in operation said top edge forms a weir for water passing from said inlet chamber to said filter chamber.

4. An external filter as claimed in claim 3, wherein the lower part of said first separator plate is provided with means defining a plurality of perforations, said perforations extending no higher than the level of said top edge of said third separator plate.

5. An external filter as claimed in claim 3, wherein said opposed side walls of said housing are provided with integrally formed guide rails which position said first and third separator plates.

6. An external filter for cleaning the water of an aquarium, including inlet means for supplying water to be filtered from said aquarium to said filter, a housing, means within said housing defining a filter chamber and a pair of other chambers which communicate with said filter chamber to allow passage of water between said filter chamber and each of the other of said chambers, at least one of said other chambers being adapted to form an outlet chamber for filtered water and being provided with means for returning said filtered water to said aquarium comprising a tube extending downwards from the bottom of said outlet chamber, a closure at the lower end of said tube, a second tube positioned within said first tube and extending upwards through said outlet chamber to above said outlet chamber, means defining an opening at the lower end of said second tube and adjacent the lower end of said first tube whereby said first and second tubes communicate with each other, an overflow channel adjacent the upper end of said second tube, and air supply means connected to the lower end of said second tube whereby air is injected into said second tube to initiate a gas lift for raising filtered water up said second tube, means defining an opening at the upper end of said second tube whereby said raised filtered water flows into said overflow channel for direction back to said aquarium, and including means for collecting the protein foam mounted over said overflow channel.

* * * * *